US008326343B2

(12) United States Patent
Lee

(10) Patent No.: US 8,326,343 B2
(45) Date of Patent: Dec. 4, 2012

(54) MOBILE COMMUNICATION TERMINAL AND TEXT-TO-SPEECH METHOD

(75) Inventor: Yong Seok Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1778 days.

(21) Appl. No.: 11/603,607

(22) Filed: Nov. 22, 2006

(65) Prior Publication Data

US 2008/0045199 A1 Feb. 21, 2008

(30) Foreign Application Priority Data

Jun. 30, 2006 (KR) ........................ 10-2006-0060232

(51) Int. Cl.
*H04M 1/00* (2006.01)

(52) U.S. Cl. ............. 455/550.1; 348/14.01; 379/420.01; 379/434; 704/270; 715/204; 715/254; 715/716

(58) Field of Classification Search .......... 370/351–356, 370/259–271; 379/88.01–88.06, 88.13, 88.14, 379/88.17, 201.01–201.02, 419, 432, 434; 455/563, 412.1–420, 426.2, 550.1–560; 704/270–275, 277; 709/201–207, 217–248; 348/14.01–14.16
See application file for complete search history.

(56) References Cited

U.S. PATENT DOCUMENTS 3,704,345 A * 11/1972 Coker et al. .................. 704/266
4,278,838 A * 7/1981 Antonov ....................... 704/260
4,406,626 A * 9/1983 Anderson et al. ............. 704/270
5,241,656 A * 8/1993 Loucks et al. ................ 715/794
5,892,511 A * 4/1999 Gelsinger et al. ............. 715/794
5,899,975 A 5/1999 Nielsen
5,995,935 A * 11/1999 Hagiwara et al. ............. 704/272
6,075,531 A * 6/2000 DeStefano .................... 715/788
6,453,281 B1 * 9/2002 Walters et al. ................ 704/200
6,701,162 B1 * 3/2004 Everett ....................... 455/556.1
6,708,152 B2 * 3/2004 Kivimaki ...................... 704/260
6,728,675 B1 * 4/2004 Maddalozzo et al. ........ 704/258
6,801,793 B1 * 10/2004 Aarnio et al. ................. 455/566
6,812,941 B1 * 11/2004 Brown et al. ................. 715/854
6,931,255 B2 * 8/2005 Mekuria ....................... 455/466
6,934,907 B2 * 8/2005 Brunet et al. ................. 715/200
(Continued)

FOREIGN PATENT DOCUMENTS

EP 1 431 958 6/2004
(Continued)

OTHER PUBLICATIONS

R. A. Frost, Speechnet: A Network of Hyperlinked Speech-Accessible Objects.
(Continued)

*Primary Examiner* — Hemant Patel
(74) *Attorney, Agent, or Firm* — The Farrell Law Firm, P.C.

(57) ABSTRACT

A mobile communication terminal and text-to-speech method. The mobile communication terminal includes a display unit for displaying at least one object on a screen; a controller for identifying a depth of an activated object on the screen and finding a speech data set mapped to the identified depth; a speech synthesizer for converting textual contents of the activated object into audio wave data using the found speech data set; and an audio processor for outputting the audio wave data in speech sounds. As a result, textual contents of different objects are output in different voices so the user can easily distinguish one object from another object.

20 Claims, 6 Drawing Sheets

U.S. PATENT DOCUMENTS

| | | | | |
|---|---|---|---|---|
| 7,013,154 | B2 * | 3/2006 | Nowlan | 455/466 |
| 7,054,478 | B2 * | 5/2006 | Harman | 382/154 |
| 7,272,377 | B2 * | 9/2007 | Cox et al. | 455/403 |
| 7,305,068 | B2 * | 12/2007 | Tucker et al. | 379/88.11 |
| 7,305,342 | B2 * | 12/2007 | Shizuka et al. | 704/260 |
| 7,450,960 | B2 * | 11/2008 | Chen | 455/550.1 |
| 7,657,837 | B2 * | 2/2010 | Shappir et al. | 715/751 |
| 7,747,944 | B2 * | 6/2010 | Gerhard et al. | 715/236 |
| 7,877,486 | B2 * | 1/2011 | Da Palma et al. | 709/227 |
| 8,020,089 | B1 * | 9/2011 | Brichford et al. | 715/234 |
| 2002/0026320 | A1 * | 2/2002 | Kuromusha et al. | 704/270 |
| 2002/0191757 | A1 * | 12/2002 | Belrose | 379/88.13 |
| 2003/0028377 | A1 * | 2/2003 | Noyes | 704/258 |
| 2004/0008211 | A1 * | 1/2004 | Soden et al. | 345/623 |
| 2004/0128133 | A1 * | 7/2004 | Sacks et al. | 704/270 |
| 2005/0050465 | A1 * | 3/2005 | Horton et al. | 715/526 |
| 2005/0060665 | A1 * | 3/2005 | Rekimoto | 715/810 |
| 2005/0096909 | A1 * | 5/2005 | Bakis et al. | 704/260 |
| 2006/0079294 | A1 * | 4/2006 | Chen | 455/566 |
| 2006/0224386 | A1 * | 10/2006 | Ikegami | 704/260 |
| 2007/0101290 | A1 * | 5/2007 | Nakashima et al. | 715/797 |
| 2008/0291325 | A1 * | 11/2008 | Teegan et al. | 348/552 |
| 2009/0048821 | A1 * | 2/2009 | Yam et al. | 704/3 |
| 2011/0029637 | A1 * | 2/2011 | Morse | 709/217 |

FOREIGN PATENT DOCUMENTS

| | | |
|---|---|---|
| GB | 2 388 286 | 11/2003 |

OTHER PUBLICATIONS

Peer Shajahan et al., Representing Hierarchies Using Multiple Synthetic Voices, Proceedings of the Eighth International Conference on Information Visualization, 2004.

* cited by examiner

MOBILE COMMUNICATION TERMINAL AND TEXT-TO-SPEECH METHOD

PRIORITY

This application claims priority to an application filed in the Korean Intellectual Property Office on Jun. 30, 2006 and assigned Serial No. 2006-0060232, the contents of which are incorporated herein by reference.

BACKGROUND OF THE INVENTION

1. Field of the Invention

The present invention relates generally to a mobile communication terminal having a text-to-speech function and, more particularly, to a mobile communication terminal and method for producing different speech sounds for different screen objects.

2. Description of the Related Art

A portable terminal is a terminal that can be carried with a person and is capable of supporting wireless communication. A mobile communication terminal, Personal Digital Assistant (PDA), smart phone, and International Mobile Telecommunications-2000 (IMT-2000) terminal are examples of such a portable terminal. The following descriptions are focused on a mobile communication terminal.

With advances in communication technologies, a user in motion can readily carry a mobile communication terminal and send and receive calls at most times and places. In addition to conventional phone call processing, an advanced mobile communication terminal supports various functions such as text message transmission, schedule management, Internet access, etc.

When a user accesses the Internet for an information search with their mobile communication terminal, searched textual information is displayed on a screen of the mobile communication terminal. However, the user must look at the screen until the user finishes reading the textual information. Further, owing to a small picture size of the screen, the user may experience difficulty in reading textual information on the screen.

A text-to-speech (TTS) function, which takes text as input and produces speech sounds as output, may help to solve this problem. For example, in a mobile communication terminal, the TTS function can be used to produce speech sounds from a received text message, an audible signal corresponding to the current time, and audible signals corresponding to individual characters and symbols.

However, a conventional TTS function for a mobile communication terminal produces speech sounds using the same voice at all times. Consequently, it may be difficult to distinguish display states of the mobile communication terminal based on the TTS output.

SUMMARY OF THE INVENTION

The present invention has been made in view of the above problems, and an object of the present invention is to provide a mobile communication terminal and text-to-speech method that produce different speech sounds corresponding to individual display situations.

Another object of the present invention is to provide a mobile communication terminal and text-to-speech method that produce different speech sounds corresponding to depths of screen objects.

In accordance with the present invention, there is provided a mobile communication terminal capable of text-to-speech synthesis, the terminal including a controller for identifying a depth of an activated object on a screen and finding a speech data set mapped to the identified depth; a speech synthesizer for converting textual contents of the activated object into audio wave data using the found speech data set; and an audio processor for outputting the audio wave data in speech sounds.

In accordance with the present invention, there is also provided a text-to-speech method for a mobile communication terminal, the method including identifying a depth of an activated object on a screen; finding a speech data set mapped to the identified depth; and outputting an audible signal corresponding to textual contents of the activated object using the found speech data set.

In a feature of the present invention, textual contents of different objects are output in different voices according to depths of the objects. For example, when two pop-up windows are displayed on a screen in an overlapping manner, textual contents of the pop-up windows are output in different voices so the user can easily distinguish one pop-up window from the other pop-up window.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
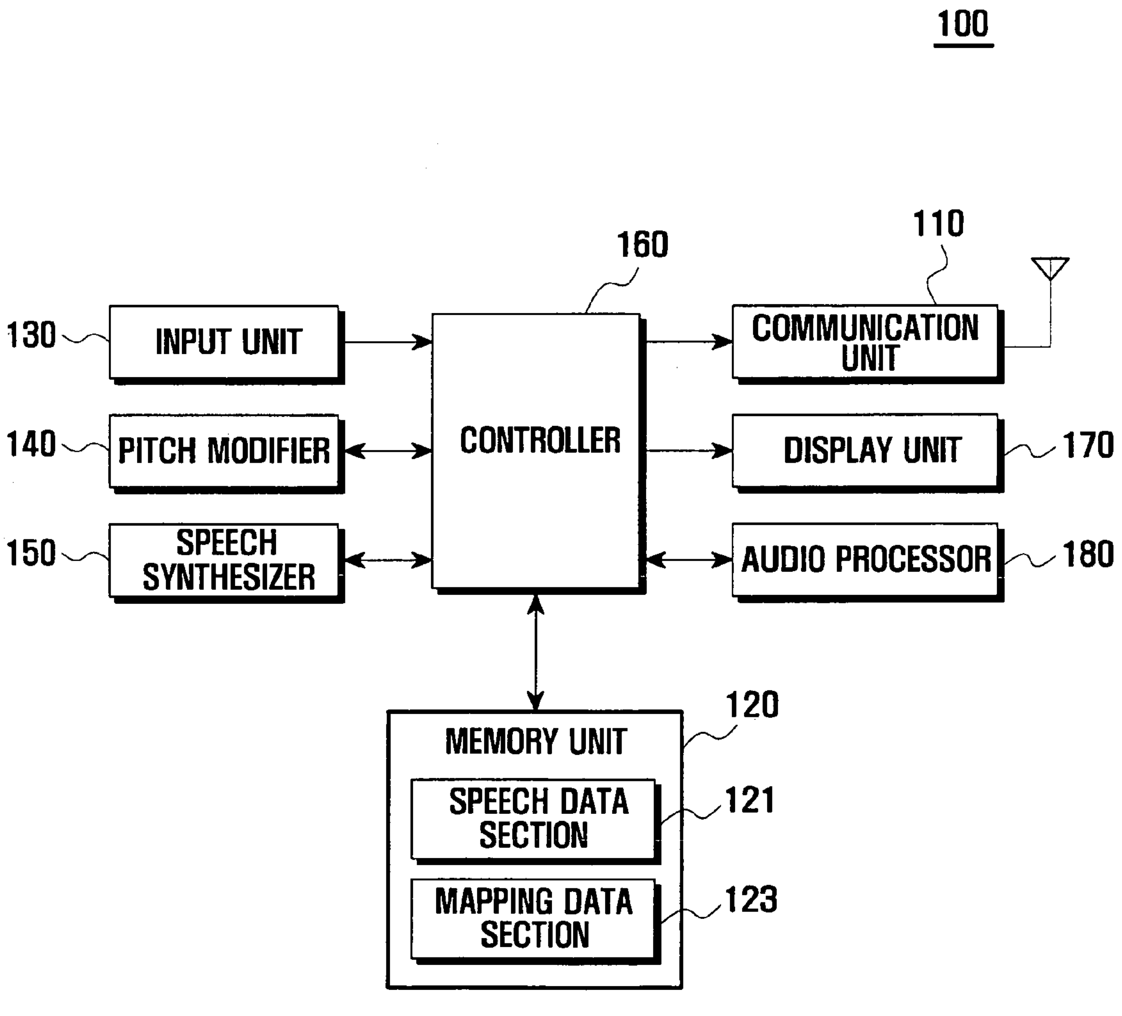
FIG. 1 illustrates a configuration of a mobile communication terminal according to the present invention.

Hereinafter, preferred embodiments of the present invention are described in detail with reference to the accompanying drawings. The same reference symbols identify the same or corresponding elements in the drawings. Some constructions or processes known in the art may be not described to avoid obscuring the invention in unnecessary detail.

In the description, the term 'object' refers to a window displayed on a screen, such as a pop-up menu, pop-up notice and message edit window, unless the context dictates otherwise.

The term 'depth' is used to decide which object should be hidden when objects overlap. For example, if two objects overlap, an object of a greater depth (for example, depth '2') is drawn on top of another object of a lesser depth (for example, depth '1').

FIG. 1 shows a mobile communication terminal according to the present invention. The mobile communication terminal 100 includes a communication unit 110, a memory unit 120, an input unit 130, a pitch modifier 140, a speech synthesizer 150, a controller 160, a display unit 170, and an audio processor 180.

The communication unit 110, for a sending function, converts data to be transmitted into a radio frequency (RF) signal and transmits the RF signal through an antenna to a corresponding base station. The communication unit 110, for a receiving function, receives an RF signal carrying data through the antenna from a corresponding base station, converts the RF signal into an intermediate frequency (IF) signal, and outputs the IF signal to the controller 160. The transmitted or received data may include voice data, image data, and various message data such as a Short Message Service message, Multimedia Message Service message and Long Message Service message.

The memory unit 120 stores programs and related data for the operation of the mobile terminal 100 and for the control operation of the controller 160, and may be composed of various memory devices such as an Erasable Programmable Read Only Memory, Static Random Access Memory, flash memory, etc. In particular, the memory unit 120 includes a speech data section 121 for storing at least one base speech data set, and a mapping data section 123 for storing information regarding mappings between depths of objects and speech data sets. Speech data sets may be pre-installed in the mobile communication terminal 100 during the manufacturing process before shipment, or be downloaded from a web server according to user preferences.

The pitch modifier 140 performs pitch modification as needed under normal operating conditions. The memory unit 120 may store either one base speech data set or multiple base speech data sets corresponding to, for example, male, female and baby voices.

When dynamic pitch modification in operation is not possible due to performance degradation, pitch-modified speech data sets stored in the memory unit 120 may be used. For example, the memory unit 120 stores multiple modified speech data sets that are pitch-modified from the base speech data set under the control of the pitch modifier 140. The memory unit 120 also stores information regarding mappings between depths of objects and pitch-modified speech data sets, in which the depths of objects are mapped to the pitch-modified speech data sets in a one-to-one manner, preferably according to a user selection.

If multiple speech data sets (for example, a male speech data set, female speech data set and baby speech data set) are available, the memory unit 120 stores information regarding mappings between the depths of objects and the available speech data sets, in which the depths of objects are mapped to the speech data sets in a one-to-one manner, preferably according to a user selection.

The input unit 130 may include various devices such as a keypad and touch screen, and is used by the user to select a desired function or to input desired information. In particular, the input unit 130 inputs object addition and removal commands from the user. For example, during display of a text message on the display unit 170, if the user inputs an object addition command (for example, a menu selection command), the display unit 170 displays a corresponding list of selectable menu items on top of the text message in an overlapping manner.

The pitch modifier 140 applies pitch modification to the base speech data set stored in the memory unit 120, and creates a plurality of pitch-modified speech data sets. The pitch modifier 140 may also pitch-modify speech data that is recorded from calls in progress and stored in the memory unit 120 into pitch-modified speech data sets. Preferably, the pitch-modified speech data sets are stored in the speech data section 121.

The speech synthesizer 150 reads textual information stored in the mobile communication terminal 100, and produces speech sounds using a speech data set stored in the memory unit 120. Text-to-speech (TTS) synthesis is known in the art, and a detailed description thereof is omitted.

The controller 160 controls overall operation and states of the mobile communication terminal 100, and may include a microprocessor or digital signal processor. In particular, the controller 160 controls the display unit 170 to identify the depth of an activated object displayed on the screen, and finds a speech data set mapped to the identified depth of the activated object through the mapping data section 123.

In response to a command of object addition or removal input from the input unit 130, the controller 160 controls the display unit 170 to identify the depth of a newly activated object, and newly finds a speech data set mapped to the identified depth.

When an activated object is determined to include an attached file, the controller 160 treats the attached file as an independent object, and obtains information on the attached file (for example, a file name). The controller 160 then identifies the depths of the activated object and attached file, and finds speech data sets mapped respectively to the identified depths.

Thereafter, the controller 160 controls the speech synthesizer 150 to convert textual contents of the activated object into audio wave data using a speech data set associated with the object, and to output the audio wave data in the form of an audible signal through the audio processor 180. When the attached file is selected and activated, textual contents of the attached file are also converted into audio wave data using an associated speech data set and fed to the audio processor 180 for output in the form of an audible signal.

In response to a request for state information input from the input unit 130, the controller 160 controls the speech synthesizer 150 to convert the requested state information into an audible signal using a preset speech data set, and controls the audio processor 180 to output the audible signal, preferably in a low-tone voice. The speech data set associated with state information can be changed according to a user selection. The state information may be related to at least one of the current time, received signal strength, remaining battery power, and message reception.

The controller 160 periodically checks preset state report times, and controls the audio processor 180 to output information on current states of the mobile communication terminal 100 using a preset speech data set at regular intervals of, preferably, 5 to 10 minutes. The interval between state outputs can be changed according to a user selection.

The display unit 170 displays operation modes and states of the mobile communication terminal 100. In particular, the display unit 170 may display one object on top of another object on the screen in an overlapping manner. For example, during display of a text message, if a menu selection command is input through the input unit 130, the display unit 170 displays a corresponding list of selectable menu items on top of the displayed text message in an overlapping manner.

The audio processor 180 converts audio wave data, which is converted from input textual information by the speech synthesizer 150, preferably using a speech data set associated with the mapping information in the memory unit 120, into an analog speech signal, and outputs the speech signal through a speaker.

Figure 2:
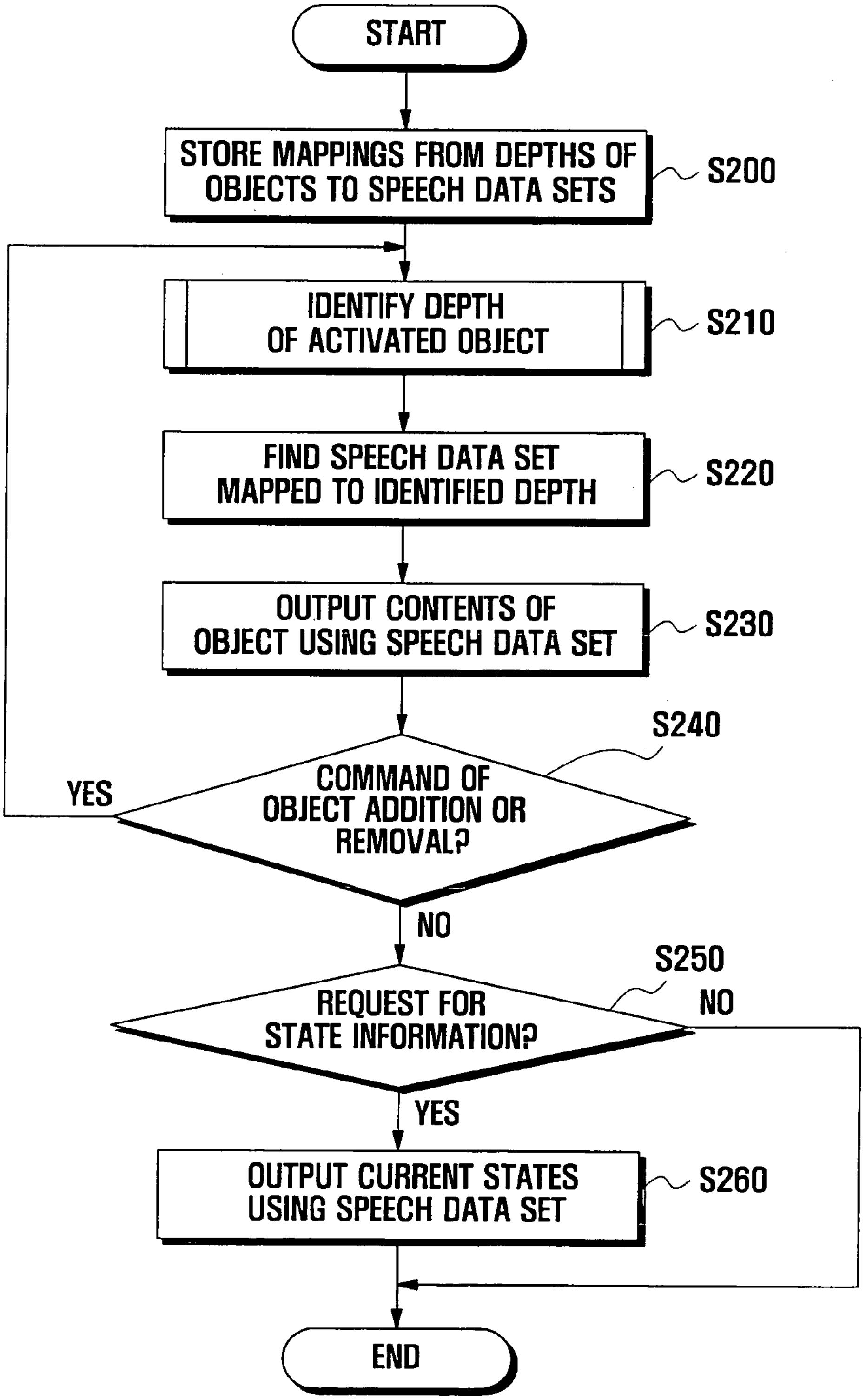
FIG. 2 is a flow chart illustrating steps of a text-to-speech method according to the present invention.

FIG. 2 shows steps of a text-to-speech method according to the present invention. Referring to FIGS. 1 and 2, the method is described below.

The controller 160 stores, in the mapping data section 123, information regarding mappings between depths of objects and speech data sets stored in the speech data section 121, according to user selections (S200). Preferably, the depths of objects are mapped to the speech data sets in a one-to-one manner. Preferably, the speech data section 121 stores at least one base speech data set and a plurality of pitch-modified speech data sets generated by the pitch modifier 140.

The controller 160 identifies the depth of an activated object on a screen (S210). Step S210 is described later in relation to FIG. 3.

The controller 160 finds a speech data set mapped to the identified depth using the mapping information in the mapping data section 123 (S220). The controller 160 controls the speech synthesizer 150 to produce audio wave data corresponding to textual contents of the activated object using the found speech data set, and controls the audio processor 180 to output the generated audio wave data as an audible signal (S230). The controller 160 determines whether a command of object addition or removal is input through the input unit 130 (S240). If a command of object addition or removal is input, the controller 160 returns to step S210 and repeats steps S210 to S230 to process a newly activated object on the screen.

For example, referring to the display screen representation in FIG. SA, the controller 160 finds a speech data set mapped to the depth of an activated text message 131, controls the speech synthesizer 150 to generate audio wave data corresponding to textual contents of the text message 131 using the found speech data set, and controls output of the generated audio wave data through the audio processor 180. Thereafter, in response to an object addition command, the controller 160 displays a list of menu items 133, generates audio wave data corresponding to the list of menu items 133 (for example, ‘reply’, ‘forward’, ‘delete’, ‘save’) using a speech data set mapped to the depth of the list of menu items 133, and outputs the generated audio wave data as an audible signal. Because the list of menu items 133 and the text message 131 are different objects, their contents are preferably output in different voices.

If no command of object addition or removal is determined to be input at step S240, the controller 160 determines whether a request for state information is input (S250). If a request for state information is input, the controller 160 controls the speech synthesizer 150 to convert current state information of the mobile communication terminal 100 into an audible signal using a preset speech data set, and controls the audio processor 180 to output the audible signal (S260). The state information may be related to at least one of the current time, received signal strength, remaining battery power, and message reception. Further, the controller 160 periodically checks state report times (preferably, around every five to ten minutes) preset by the user. At each state report time, the controller 160 controls the speech synthesizer 150 to convert the current state information of the mobile communication terminal 100 into an audible signal using a preset speech data set, and controls the audio processor 180 to output the audible signal.

Figure 5A:
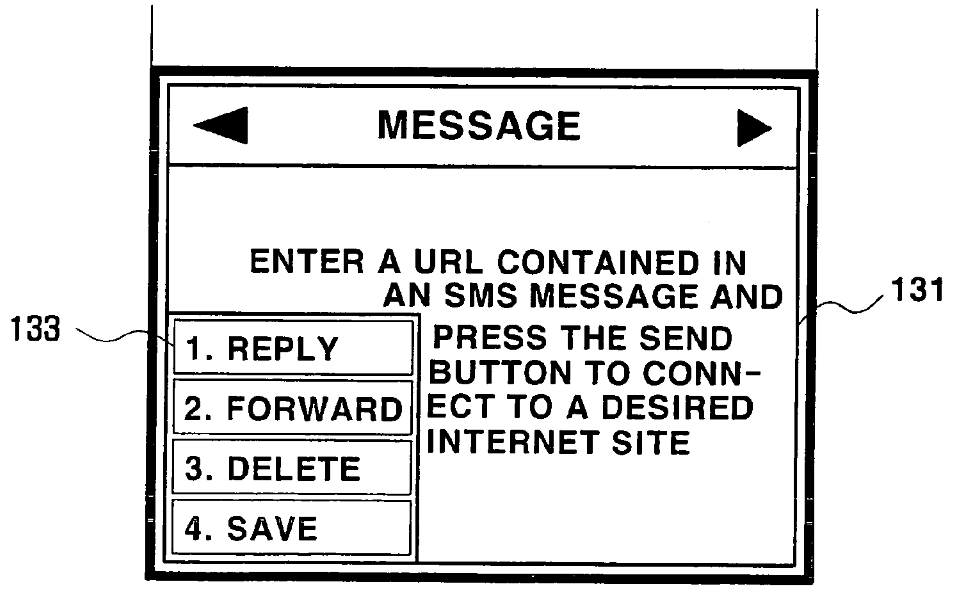
FIGS. 5A to 5C illustrate display screen representations of outputs of the method of FIG. 2.
Figure 5B:
Figure 5C:
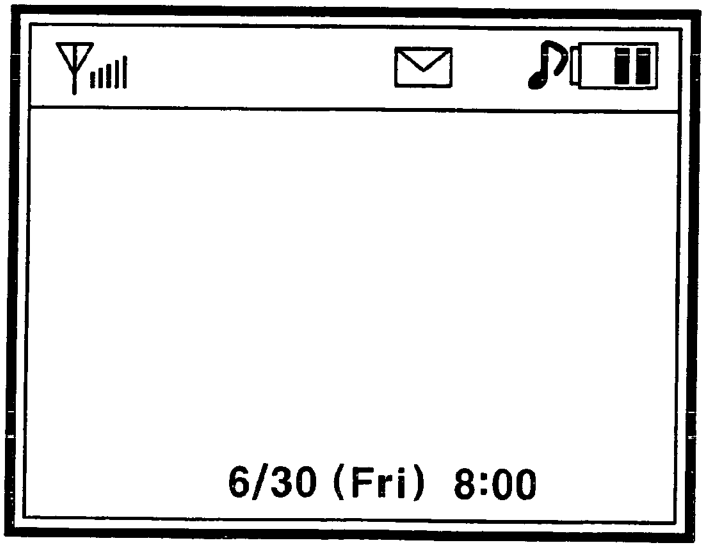

For example, referring to the display screen representation in FIG. 5C, in response to a request for state information input from the user during an idle mode, the controller 160 outputs current states of the mobile communication terminal 100 through the audio processor 180. Preferably, in response to input of a request for state information during any mode, the controller 160 converts current states into an audible signal through the speech synthesizer 150 using a preset speech data set, and outputs the audible signal through the audio processor 180.

Figure 3:
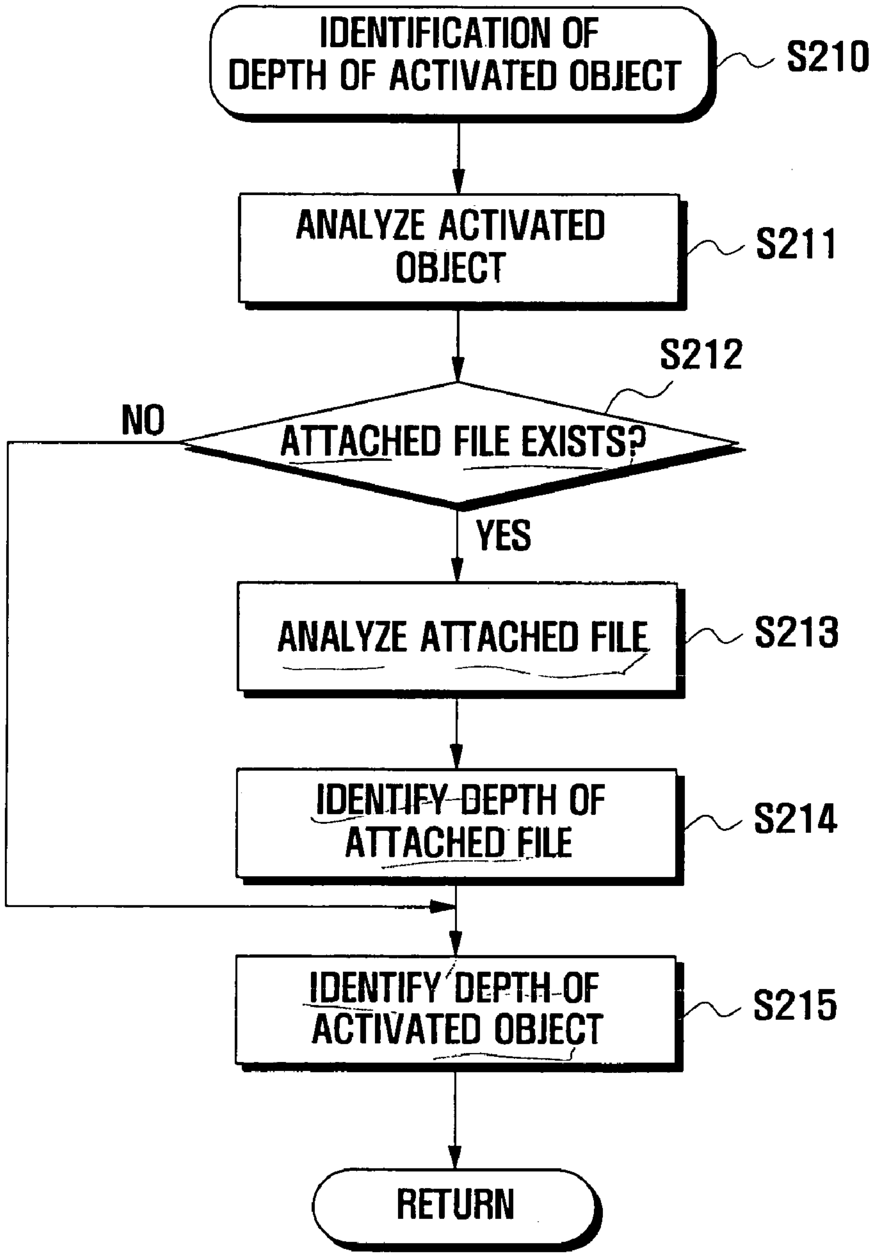
FIG. 3 is a flow chart illustrating a step in the method of FIG. 2 of identifying the depth of an object.

FIG. 3 shows the step (step S210 in FIG. 2) of identifying the depth of an activated object. Referring to FIGS. 1 and 3, the step is described below.

The controller 160 analyzes the activated object in step S211 and determines whether a file is attached to the activated object in step S212. If a file is attached, the controller 160 treats the attached file as an independent object and analyzes the attached file in step S213, and identifies the depth of the attached file in step S214.

Thereafter, the controller 160 identifies the depth of the activated object in step S215.

For example, referring to the display screen representation in FIG. 5B, during display of a received message 135 in response to a user selection, the controller 160 analyzes the message 135 and detects an attached file 137. The attached file 137 is treated as an independent object, and the controller 160 obtains information on the attached file 137 (for example, file name). The controller 160 identifies the depths of the message 135 and attached file 137. Thereafter, the controller 160 finds speech data sets mapped respectively to the identified depths, and controls the speech synthesizer 150 to generate audio wave data corresponding to textual contents of the displayed message 135 using the found speech data set, and also controls output of the generated audio wave data through the audio processor 180. Further, when the attached file 137 is selected by the user and activated, the controller 160 generates audio wave data corresponding to textual contents of the attached file 137 using a speech data set mapped to the identified depth, and outputs the generated audio wave data through the audio processor 180. As a result, textual contents of the message 135 and attached file 137 are output in different voices, and the user can easily distinguish the message 135 from the attached file 137.

Figure 4A:
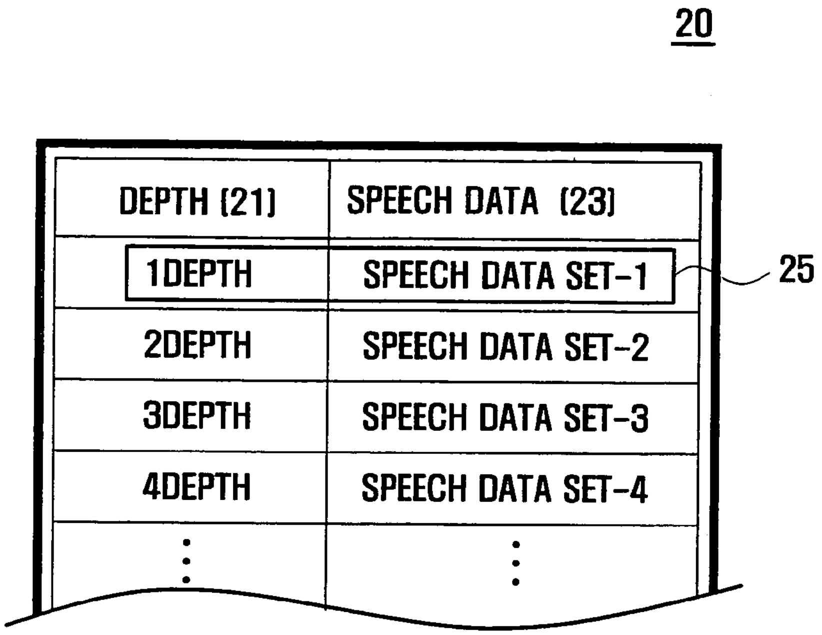
FIGS. 4A to 4C illustrate speech data mapping tables of the method of FIG. 2.
Figure 4B:
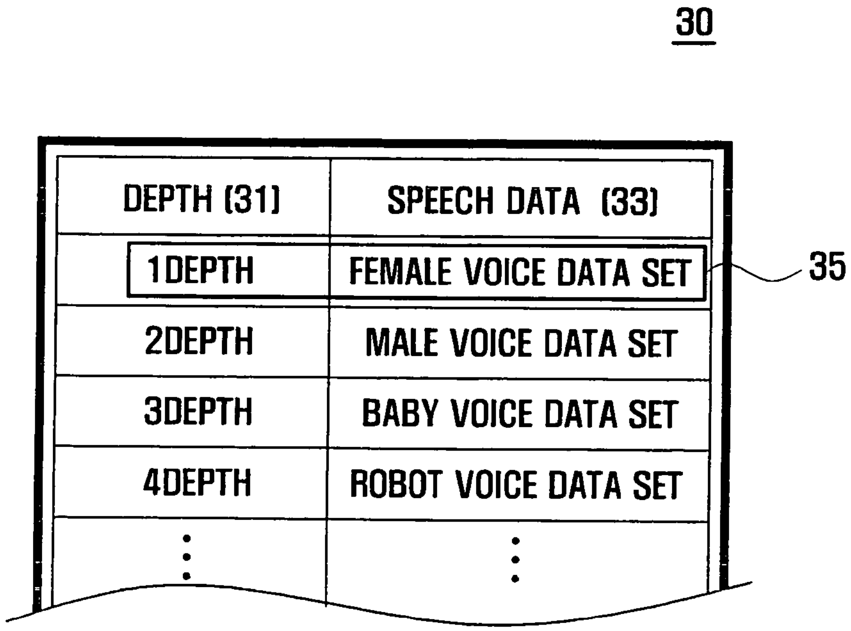
Figure 4C:
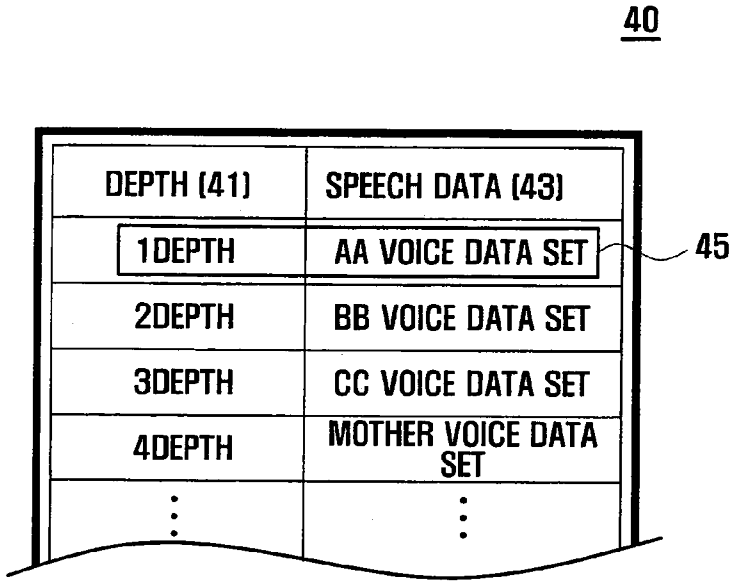

FIGS. 4A and 4C illustrate speech data mapping tables of the method shown in FIG. 2.

Referring to FIG. 4A, a speech data mapping table 20 stored in the mapping data section 123 includes depth fields 21 and speech data fields 23, for storing mappings between depths of objects and speech data sets stored in the speech data section 121. Preferably, the depths of objects are mapped to the speech data sets in a one-to-one manner according to a user selection. Preferably, the speech data section 121 stores a plurality of pitch-modified speech data sets created by the pitch modifier 140. For example, when a base speech data set is stored in the speech data section 121, a plurality of pitch-modified speech data sets can be created by application of pitch modification to the base speech data set. In the speech data mapping table 20, object depths ‘1’, ‘2’ and ‘3’ are mapped to pitch-modified speech data sets ‘speech data set-1’, ‘speech data set-2’ and ‘speech data set-3’, respectively.

Referring to FIG. 4B, a speech data mapping table 30 stored in the mapping data section 123 includes depth fields 31 and speech data fields 33, for storing mappings between depths of objects and speech data sets stored in the speech data section 121. Preferably, the depths of objects are mapped to the speech data sets in a one-to-one manner according to a user selection. Preferably, the speech data section 121 stores various speech data sets with different voices. The speech data sets may be pre-installed in the mobile communication terminal 100 during the manufacturing process before shipment, or be downloaded from a web server according to user preferences. For example, in the speech data mapping table 30, object depths ‘1’, ‘2’, ‘3’ and ‘4’ are mapped to speech data sets ‘female voice data set’, ‘male voice data set’, ‘baby voice data set’ and ‘robot voice data set’, respectively.

Referring to FIG. 4C, a speech data mapping table 40 stored in the mapping data section 123 includes depth fields 41 and speech data fields 43, for storing mappings between depths of objects and speech data sets stored in the speech data section 121. Preferably, the depths of objects are mapped to the speech data sets in a one-to-one manner according to a user selection. Preferably, the speech data section 121 stores various speech data sets corresponding to voices of intimate persons who frequently make a phone conversation. For example, in the speech data mapping table 40, object depths '1', '2', '3' and '4' are mapped to speech data sets 'AA voice data set', 'BB voice data set', 'CC voice data set' and 'mother voice data set', respectively.

As apparent from the above description, the present invention provides a mobile communication terminal and text-to-speech method, wherein textual contents of different objects are output in different voices so the user can easily distinguish one object from another object. For example, while contents of a text message are output using a text-to-speech function, if a particular menu is selected by the user and a corresponding list of menu items, such as 'reply', 'retransmit', 'delete' and 'forward', is displayed, the list of menu items is output using the text-to-speech function. The contents of the text message and the list of menu items are output in different voices, informing that the currently activated object is not the text message but the list of menu items.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. A mobile communication terminal capable of text-to-speech synthesis, the terminal comprising:

a display unit for displaying at least one object on a screen;

a controller for identifying a depth of an activated object on the screen and finding a speech data set mapped to the identified depth;

a speech synthesizer for converting textual contents of the activated object into audio wave data using the found speech data set; and an audio processor for outputting the audio wave data in speech sounds.

2. The mobile communication terminal of claim 1, further comprising:

an input unit for receiving a command of object addition or removal from a user, and wherein the controller activates, in response to a command of object addition or removal received by the input unit, a newly selected object, identifies the depth of the newly activated object, and finds a speech data set mapped to the identified depth.

3. The mobile communication terminal of claim 1, further comprising a memory unit for storing a plurality of speech data sets and information regarding mappings between depths of objects and the speech data sets.

4. The mobile communication terminal of claim 3, further comprising a pitch modifier for creating a plurality of pitch-modified speech data sets by applying pitch modification to one of the stored speech data sets, and wherein the memory unit stores mapping information in which the depths of objects are mapped to the pitch-modified speech data sets in a one-to-one manner according to a user selection.

5. The mobile communication terminal of claim 3, wherein the memory unit stores mapping information in which the depths of objects are mapped to the stored speech data sets in a one-to-one manner according to a user selection.

6. The mobile communication terminal of claim 1, wherein the controller obtains information on an attached object, and identifies depths of the activated object and the attached object when the activated object includes an attached object.

7. The mobile communication terminal of claim 6, wherein the controller finds speech data sets mapped to the identified depths of the activated and attached objects, and controls output of audible signals corresponding to textual contents of the activated and attached objects using corresponding mapped speech data sets.

8. The mobile communication terminal of claim 1, wherein the controller controls, in response to a request for state information input through an input unit, output of an audible signal corresponding to current state information of the mobile communication terminal using a preset speech data set.

9. The mobile communication terminal of claim 8, wherein the state information is related to at least one of the current time, received signal strength, remaining battery power, and message reception.

10. The mobile communication terminal of claim 8, wherein the controller periodically checks preset state report times, and, at each state report time, controls output of an audible signal corresponding to the current state information of the mobile communication terminal using the preset speech data set.

11. A text-to-speech method for a mobile communication terminal that is capable of displaying multiple objects on a screen in an overlapping manner, the method comprising:

identifying a depth of an activated object on the screen;

finding a speech data set mapped to the identified depth; and outputting an audible signal corresponding to textual contents of the activated object using the found speech data set.

12. The text-to-speech method of claim 11, further comprising identifying the depth of a newly activated object, and finding a speech data set mapped to the identified depth when the activated object is replaced in response to input of a command of object addition or removal.

13. The text-to-speech method of claim 11, further comprising storing a plurality of speech data sets and information regarding mappings between depths of objects and the speech data sets.

14. The text-to-speech method of claim 13, further comprising creating a plurality of pitch-modified speech data sets by applying pitch modification to one of the stored speech data sets, and wherein the storing information regarding mappings step stores mapping information in which the depths of objects are mapped to the pitch-modified speech data sets in a one-to-one manner.

15. The text-to-speech method of claim 13, wherein the storing information regarding mappings step stores mapping information in which the depths of objects are mapped to the stored speech data sets in a one-to-one manner.

16. The text-to-speech method of claim 11, wherein the identifying a depth step comprises obtaining information on an attached object, and identifying the depths of the activated object and the attached object when the activated object includes an attached object, and wherein the finding a speech data set step comprises finding speech data sets mapped to identified depths of activated and attached objects, and outputting audible signals corresponding to textual contents of the activated and attached objects using corresponding mapped speech data sets.

17. The text-to-speech method of claim 11, further comprising outputting, in response to input of a request for state information, an audible signal corresponding to current state information of the mobile communication terminal using a preset speech data set.

18. The text-to-speech method of claim 17, wherein the state information is related to at least one of the current time, received signal strength, remaining battery power, and message reception.

19. The text-to-speech method of claim 17, wherein the outputting an audible signal step comprises periodically checking preset state report times, and outputting an audible signal corresponding to the current state information of the mobile communication terminal using the preset speech data set at each state report time.

20. A mobile communication terminal capable of text-to-speech synthesis, the terminal comprising:

a display unit for displaying at least one object on a screen;

a controller for identifying a depth of an activated object on the screen and finding a speech data set mapped to the identified depth, the depth being used to decide which object should be hidden when a plurality of objects overlap;

a speech synthesizer for converting textual contents of the activated object into audio wave data using the found speech data set; and an audio processor for outputting the audio wave data in speech sounds.

* * * * *